United States Patent [19]

Crane et al.

[11] Patent Number: 4,561,105
[45] Date of Patent: Dec. 24, 1985

[54] COMPLEX PATTERN RECOGNITION METHOD AND SYSTEM

[75] Inventors: Hewitt D. Crane, Portola Valley; John S. Ostrem, Palo Alto, both of Calif.

[73] Assignee: Communication Intelligence Corporation, Menlo Park, Calif.

[21] Appl. No.: 459,282

[22] Filed: Jan. 19, 1983

[51] Int. Cl.$^4$ .............................................. G06K 9/78
[52] U.S. Cl. ........................................ 382/13; 382/30
[58] Field of Search ................... 382/3, 13, 18, 24, 30, 382/38, 42, 46, 57; 381/42

[56] References Cited

U.S. PATENT DOCUMENTS

| | | | |
|---|---|---|---|
| 3,165,718 | 1/1965 | Fleisher | 382/18 |
| 3,611,290 | 10/1971 | Luisi et al. | 382/46 |
| 3,618,016 | 11/1971 | Van Steenis | 382/30 |
| 3,700,815 | 10/1972 | Doddington et al. | 381/42 |
| 4,015,239 | 3/1977 | Fujimoto et al. | 382/24 |
| 4,027,284 | 5/1977 | Hoshino et al. | 382/30 |
| 4,035,768 | 7/1977 | Boldridge, Jr. et al. | 382/3 |
| 4,037,198 | 7/1977 | Essenmacher et al. | 382/57 |
| 4,040,009 | 8/1977 | Kadota et al. | 382/38 |
| 4,040,010 | 8/1977 | Crane et al. | |
| 4,173,753 | 11/1979 | Chou | |
| 4,179,685 | 12/1979 | O'Maley | 382/46 |
| 4,190,820 | 2/1980 | Crane et al. | 382/3 |
| 4,284,975 | 8/1981 | Odaka | |
| 4,365,235 | 12/1982 | Greanias et al. | |

FOREIGN PATENT DOCUMENTS 52-083733 7/1977 Japan .
978824 11/1979 Japan .

OTHER PUBLICATIONS

K. Ikeda et al., "On-Line Recognition of Hand-Written Characters Utilizing Positional and Stroke Vector Sequences", 1981, *Pattern Recognition*, vol. 13, No. 3, pp. 191–206.

E. F. Yhap et al., "An On Line Chinese Character Recognition System", May 1981, IBM J. Res. Develop., vol. 25, No. 3, p. 187.

Crane et al., "A Technique for the Input of Handprinted Chinese Characters Based on Sequential Stroke Recognition", Dec. 27–29, 1977, Proceedings of International Computer Symposium 1977, vol. One, pp. 246–261.

Ching Y. Suen et al., "Automatic Recognition of Handprinted Characters—The State of the Art", Apr. 1980, Proceedings of the IEEE, vol. 68, No. 4, pp. 469–487.

*Primary Examiner*—Leo H. Boudreau
*Attorney, Agent, or Firm*—Townsend and Townsend

[57] ABSTRACT

A method and system for recognizing complex patterns, such as Chinese characters (or Kanji), identifies patterns by stroke recognition using detailed information about stroke shape and specifically curvature characteristics. Written strokes are categorized into different specific stroke types and are assigned stroke identity labels by comparison of distance metrics generated with reference to stroke templates, each template comprising information specifying position of a point and permissible deviation for each such point along a stroke. Deviation values may differ from point to point and from stroke type to stroke type. The data on the written stroke may be rotated or displaced relative to each stroke template to enhance the likelihood of stroke recognition. Limited information about stroke position relative to other strokes may be preserved and employed to resolve ambiguities among accumulations of stroke identity labels found to ambiguously indicate more than one pattern or character.

42 Claims, 8 Drawing Figures

WRITTEN CHARACTER PROCESSING SYSTEM

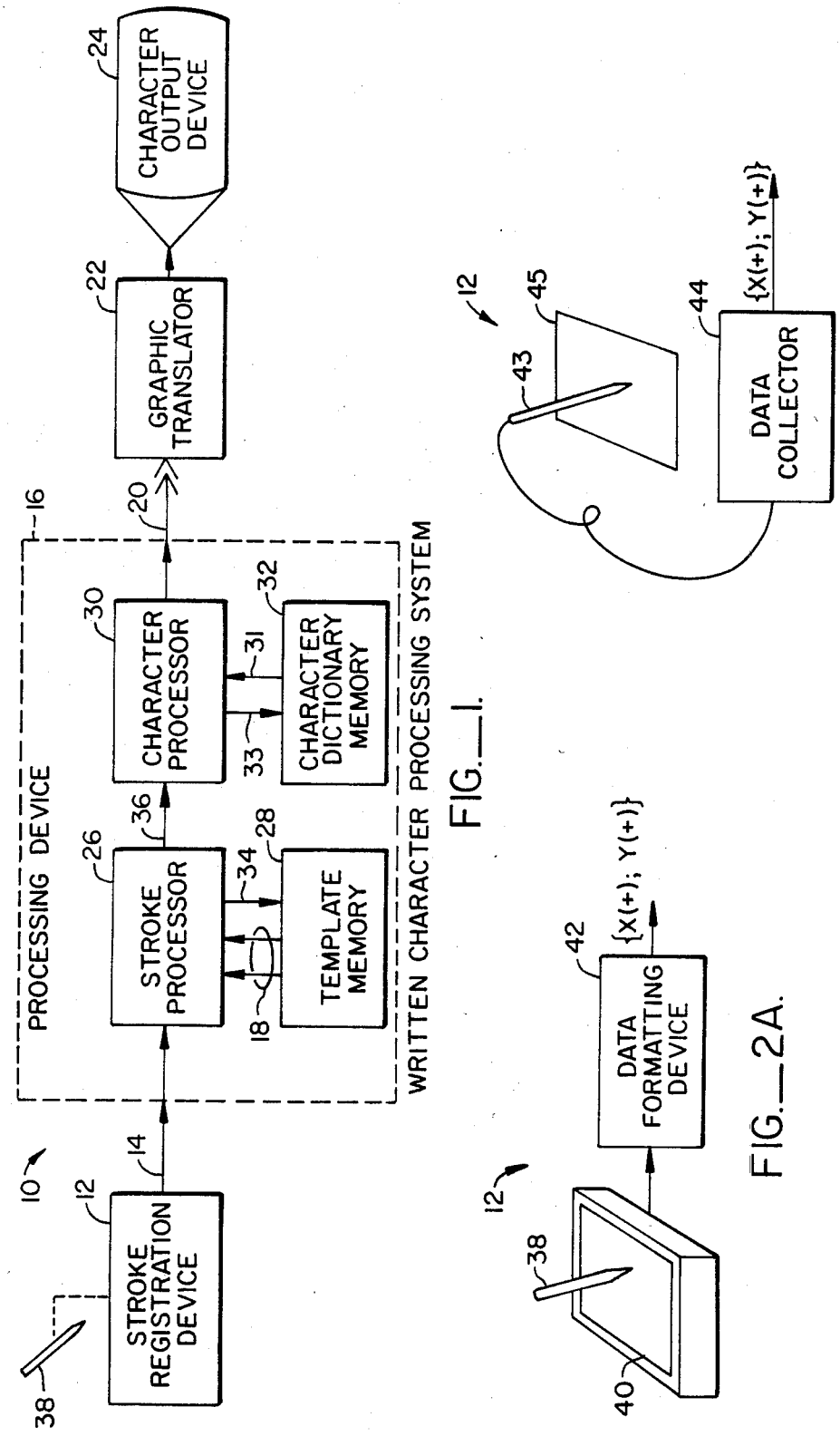
FIG._1.
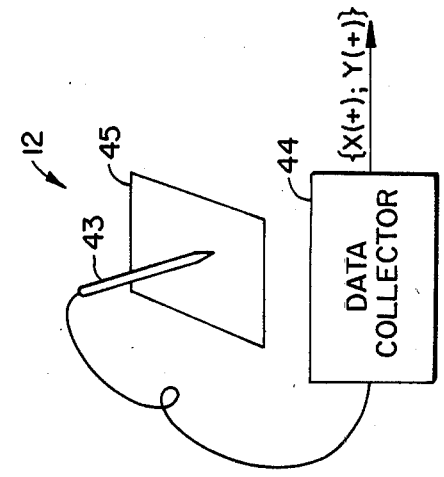
FIG._2B.
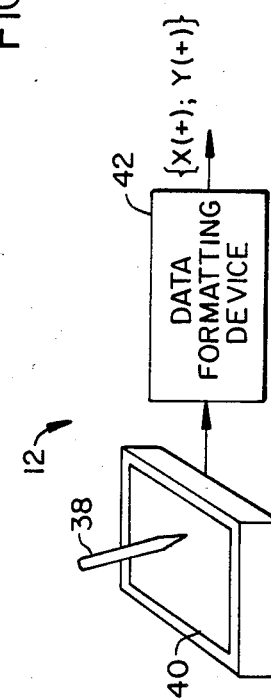
FIG._2A.

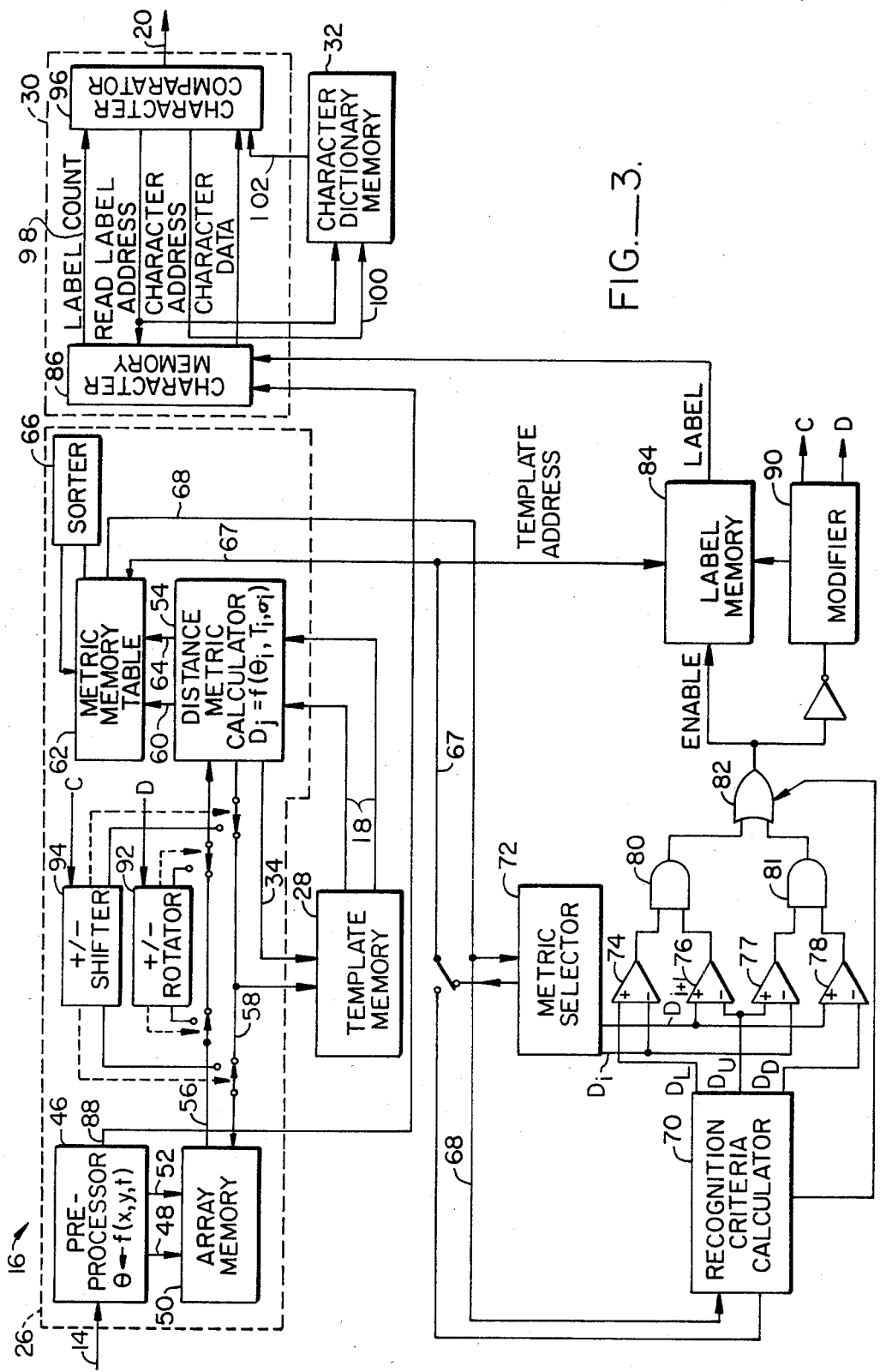

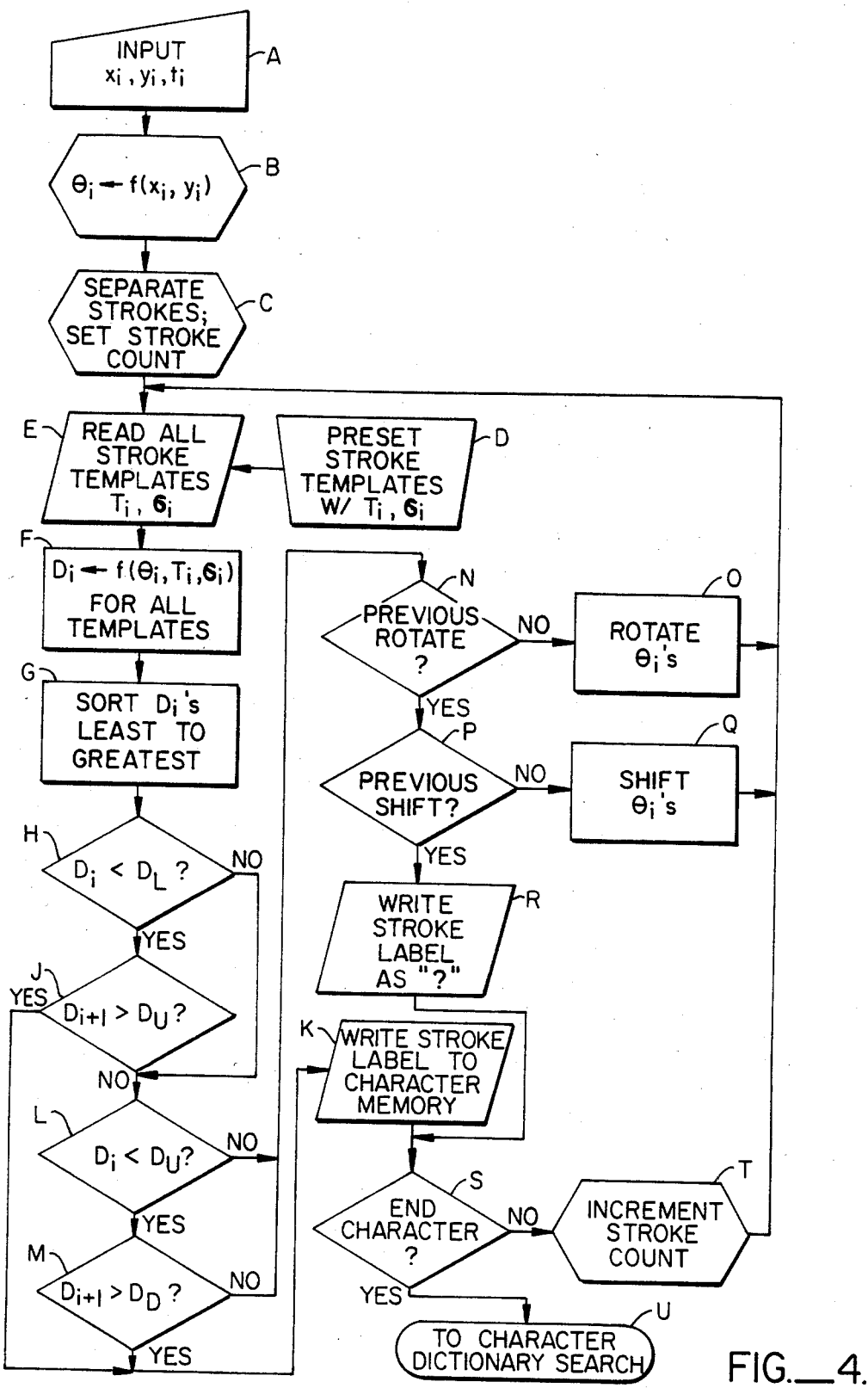
FIG._4.

| STROKE | STROKE CODE |
|---|---|
| ＼ | A |
| 一 | B |
| ｜ | C |
| ╱ | D |
| ＼ | E |
| ╱. | F |
| ⌐ | G |
| ⌐ | H |
| ㄣ | I |
| ㄥ | J |
| ㄅ | K |
| ㄥ | L |
| ㄋ | M |
| ㄋ | N |
| ㄋ | O |
| ㄋ | P |
| L | Q |
| ⌐ | R |
| ⌐ | S |
| ⌐ | T |
| ⌐ | U |
| ㄑ | V |
| ⌐ | W |
| ㄣ | X |
| ㄣ | Y |

FIG._5.

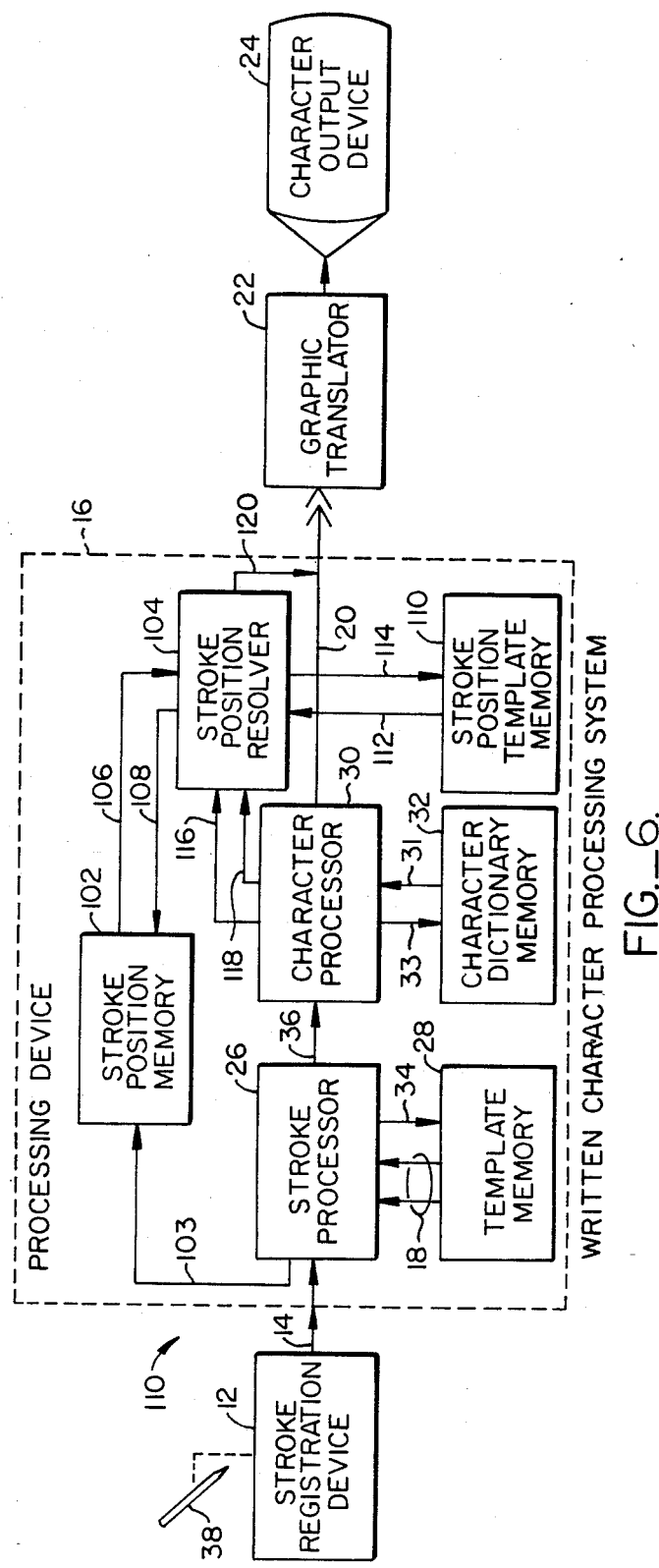
FIG._6.

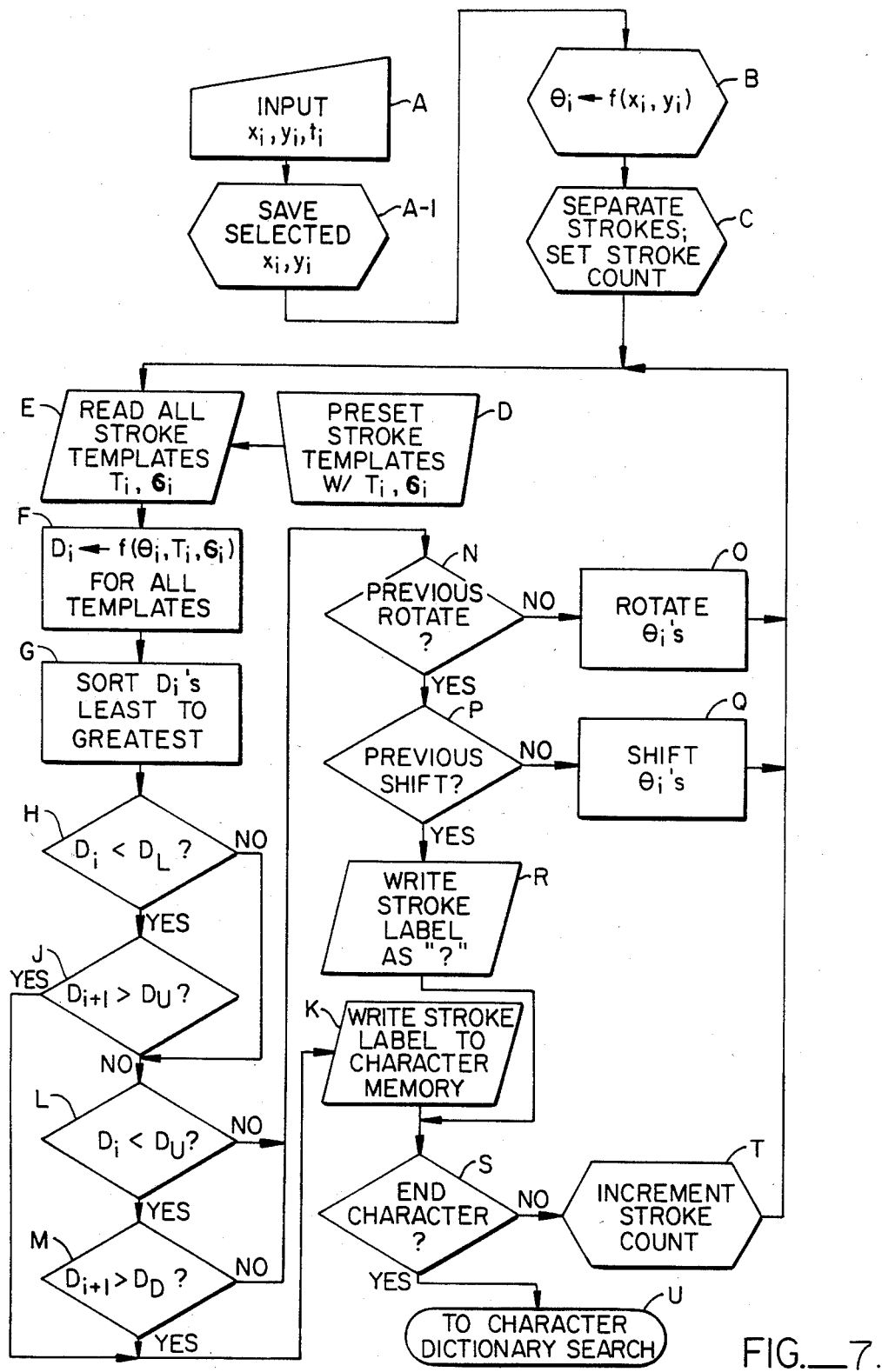
FIG._7.

COMPLEX PATTERN RECOGNITION METHOD AND SYSTEM

BACKGROUND OF INVENTION

1. Reference to Related Applications

Filed concurrently with this application are applications entitled "Confusion Grouping of Strokes in Pattern Recognition Method and System" and "Method for Distinguishing Between Complex Character Sets".

2. Field of Invention

This invention relates to pattern recognition, for example, to recognition of handwritten characters such as Chinese characters (i.e., Kanji). Specifically, this application relates to identification of complex characters composed of elements, namely strokes. As used herein strokes may include both individual strokes as well as groupings of individual strokes.

The recognition of complex characters has been pursued with limited success for many years. Kanji has been considered the greatest challenge because it is not easily adapted to keyboard input. There are for example approximately 10,000 distinguishable characters in use in the Kanji system representing various words, phrases, concepts and in some instances syllables.

Various recognition schemes have been reported for hand registered characters. The schemes are typically based on spatial and certain other limited characteristics, such as brush pressure, of elements such as strokes. A stroke is the locus and sequence of a chain of related points created by moving contact between a pattern-forming means and a pattern-accommodating means, such as a pen and a tablet or any other movement-registering instrument or system. Prior art schemes are aimed at collecting and retaining a substantial amount of information which is processed in an attempt to distinguish the character from all other characters.

Recognition of complex characters of the type of interest is made more difficult because there are no uniform definitions for the fundamental stroke types from which the characters are formed, and there is substantial variation in character formation, even by the same writer. Consequently there is a potential for confusion between differing strokes and between different characters. What is needed is a pattern recognition scheme which is capable of tolerating wide variations while accurately identifying patterns and specifically characters from groups of basic elements such as strokes.

3. Description of the Prior Art

Prior stroke recognition systems relevant to the present invention are represented by the following references:

"On-Line Recognition of Handwritten Characters", Hiroki Arakawa et al., *Review of the Electrical Communication Laboratories,* Vol. 26, Nos. 11-12, November-December 1978 describes a system in which a pair of linear waveforms is derived by recording in rectangular coordinates the movement of a handwritten point, approximating linear waveforms through a rectangular function expansion and then recognizing a character by utilizing a set of coefficients of the rectangular function.

*IEEE Transactions on Electronic Computers,* December 1967, pp. 856860; Japanese patent application No. 1977-083733 entitled "On Line Recognition Method of Handwritten Characters" filed July 12, 1977; and U.S. Pat. No. 4,173,753 to Chou entitled "Input System for Sino-Computer" represent another general type of stroke recognition technique, namely, pattern matching. In Chou, strokes are recognized as elementary patterns in strings of elementary strokes. In the '733 reference, a spatial matching technique is described. Strokes of a character to be recognized are approximated by coordinate position, and deviations from standard coordinate patterns are computed point by point and summed over the whole character to obtain decision criteria. Analysis of these types of schemes supports a conclusion that increasing the amount of information about a stroke does not necessarily lead to improved recognition accuracy. In fact, increasing the precision of stroke registration increases the difficulty of pattern matching. On the other hand, decreasing the precision of stroke registration causes confusion among strokes of similar shape but differing significance. In either extreme, stroke recognition accuracy degrades.

"On-Line Recognition of Hand-Written Characters Utilizing Positional and Stroke Vector Sequences", *Pattern Recognition,* Vol. 13, No. 3, p. 191 (Permagon Press, 1981) is a reference which reports of an extended six company/university joint effort to develop a stroke vector sequence character recognition system based on elemental stroke shapes derived from five percent to ten percent of a stroke length. A great deal of data is developed about a relatively small portion of a stroke. The proposed system is believed to be expensive and insufficiently accurate to be a practical and commercial success.

E. F. Yhap et al., "An On Line Chinese Character Recognition System", *IBM Journal of Research and Development,* Vol. 25, No. 3, p. 187 (May 1981) describes a handwritten Chinese character recognition scheme in which a large number of parameters about a Chinese character are categorized, generally in relation to positions within a field of registration.

Crane et al., "A Technique for the Input of Handprinted Chinese Characters Based on Sequential Stroke Recognition", *Proceedings of International Computer Symposium* 1977, Vol. One, p. 246 (Dec. 27-29, 1977), Taipei, Republic of China) is a survey article. It further describes a proposed character recognition technique suitable for essentially real time processing. It is based on stroke label sequence recognition where there is limited-precision stroke recognition. The paper is an early publication related to the present work and describes preliminary conclusions of the present inventors. The present invention may be used in connection with techniques described in this and other prior works.

Crane et al., U.S. Pat. No. 4,040,010 issued Aug. 2, 1977, describes a handwriting verification system in which a special pen produces signals representative of various parameters based on angularly resolved writing pressure for identifying a signature or other appropriate group of relatively simple characters or symbols. A signature is deemed to be a forgery according to the invention if the sum of the component variations of the detected signature deviates beyond some preselected threshold value established by a signature template.

Various other methods not to be confused with the present invention relate to the pictorial aspects, that is, spatial appearance, of a character. There and other schemes have been explored for many years, and substantial research efforts have been largely unsuccessful in providing a practical character recognition system which can be used in an interactive, essentially real-time environment.

SUMMARY OF THE INVENTION

According to the invention, a pattern identification method and apparatus employ detailed information about stroke shape, and preferably curvature characteristics in the form of signals representing position coordinate values, to assign identity labels to strokes. Preferably, the position coordinate values are vectors of uniform length tangential to the registered stroke which take the form of angular values in a polar coordinate system. The information about stroke shape is compared against predefined templates to determine the specific stroke intended by the set of coordinate values. Each template is a set of position coordinate values in a form compatible with the input position coordinate values and which are paired at each point with a permissible tolerance value. The tolerance values account for normal stylistic variations among writers and normal stylistic variations of the same writer. The tolerance values may differ from template to template and from point to point within a template. The greater tolerance values correspond to those portions of a stroke or those strokes where preciseness of needed match is lesser. In a specific embodiment the tolerance value is a deviation from the nominal coordinate value. Deviation values may differ by at least about one percent between the greatest deviation value and the least deviation value. End points of a stroke may be ignored to accommodate, for example, inadvertent or stylistic hooks at the end of a stroke. Specific recognition criteria establish pattern recognition. Stroke information may be rotated and linearly shifted as part of a multiple-pass identification process to improve the likelihood of obtaining a correct and acceptable identity label in the event initial processing fails to yield an acceptable result.

The application of the tolerance criteria can be modified without departing from the general philosophical approach. For example, the requirement of a separate set of deviation values may be omitted by use of rotation about a point in an individual stroke and/or by displacement of an individual stroke along its length. Similarly a set of deviation values might be defined which avoid any need for overall displacement or rotation.

Once a pattern or stroke is categorized according to the invention, it can be employed in connection with other related strokes or the like in a sequence to identify the intended multiple element character pattern. Identification of a character pattern is made by comparing strokes or the like against a catalog consisting of groups of identity labels. The identity labels are typically arranged in writing sequence.

This invention permits substantial flexibility in use and in development of a pattern vocabulary. For example, the invention permits selective disregard of information about stroke position. Precision is retained while ambiguous information can be ignored and discarded. Groups of strokes which cause recognition confusion can be assigned the same label, thereby creating confusion groups by which templates can be combined or new hybrid templates can be defined. The invention may be used in conjunction with other pattern recognition schemes to enhance overall system reliability. In particular, the invention retains that which is necessary to stroke identification and discards unneeded and redundant information at an early stage in the processing to improve processing efficiency, reliability and cost effectiveness.

The invention has numerous applications. It may be used in an interactive word processing and data entry system. Purposes include use as a teaching tool to train individuals in stroke writing and preferred stroke sequence, and as a lexicon aid for looking up pattern meanings, for example for accessing the meaning of Kanji.

The invention will be better understood by reference to the following detailed description taken in connection with the accompanying drawings.

BRIEF DESCRIPTION OF THE DRAWINGS

FIG. 1 is a block diagram of a written character processing system according to the invention.

FIG. 2A is a pictorial block diagram of one type of stroke registration means for use in accordance with the invention.

FIG. 2B is a pictorial block diagram of a second stroke registration means for use in accordance with the invention.

FIG. 3 is a block diagram of a processing device operative in accordance with the invention.

FIG. 4 is a flow chart of the method according to the invention.

FIG. 5 is a table of strokes illustrating templates in accordance with the invention.

FIG. 6 is a block diagram of an alternative embodiment of a written character processing system according to the invention.

FIG. 7 is a flow chart of an alternative method according to the invention.

DESCRIPTION OF SPECIFIC EMBODIMENTS

The invention is a pattern identification method and apparatus explained in the context of a stroke recognition system which may be used alone or in connection with other systems to recognize and process written Chinese characters. A pattern is any two-dimensional shape or sequence of movement. A stroke is the locus and sequence of a continuous chain of related points created by uninterrupted contact between a pattern-forming means and a pattern-accommodating means, such as a pen and a tablet or any other movement-registering instrument or system. A character is any combination of strokes, including a pattern, used in a writing system.

Referring to FIG. 1, a specific pattern recognition system 10 according to the invention includes a stroke registration means 12 which generates first signals representing first signal information describing written strokes as hereinafter explained, the first signals being supplied by a first signal line 14 to a data processing means 16. The processing means 16 is operative to compare second signals 18 representing second signal information describing selected model strokes to yield output signals on an output signal line 20 representing information identifying at least a portion of the pattern or written character under examination. An output signal line 20 of the data processing means 16 is connected to a graphic translator 22 which in turn drives an output device 24 such as a visual display, a printer or other character processing According to a specific embodiment of the invention, the data processing means 16 includes means for designating from the first signal information a set of selected first data points along the stroke under examination. The curvature characteristics of the stroke under examination are specified by coordinates in a reference system for use in labeling the stroke with an identifying label. In addition, according to the invention, the second signal information describing the template strokes takes the form of stroke templates. A stroke template is, in a specific embodiment, two ordered sets or pairs of values at locations or second data points along a model stroke, the first value of the pair defining relative position and the second value of the pair defining a permissible deviation value for each position.

The permissible deviation values are designed for flexibility. They may differ from stroke to stroke and from location to location along a stroke, a greater permissible deviation value corresponding to greater permissible tolerance in relative position of points along a model stroke. In the data processing means 16 the position of the first data points are compared with the positions of corresponding second data points, and then the permissible deviation values are used in a matching scheme to determine which stroke template produces the best correspondence with the stroke under examination. It is the purpose of the invention to enhance pattern identification accuracy and to decrease ambiguity among possible solutions by selective disregard of information about the characteristics of the stroke under examination. It has been determined that too much information about position, for example about position of certain parts of a stroke, can be as detrimental to identification as too little information in certain processing techniques. Yet it has been discovered that the information should be accurately registered even if the entire information is not retained or used in the recognition process.

There are many possible embodiments of the invention. The following description describes the method of the invention in reference to a specific apparatus according to the invention.

The processing means 16 includes a stroke processor 26, a template memory 28, a character processor 30 and an index memory, specifically a character dictionary memory 32. The template memory 28 is responsive to a signal on a template address select line 34 to provide second signals on second signal lines 18 to the stroke processor 26. The stroke processor 26 is operative to identify the stroke represented by the first signal information based on the second signal information in accordance with specific embodiments of the invention.

Third signals representing third signal information are provided at the output of the stroke processor 26 by a stroke label line 36 coupled to the character processor 30. The character dictionary memory 32 is responsive to a signal on a character address select line 33 to provide fourth signals on a character label line 31 to the character processor 30. The character processor 30 identifies the character represented by a collection of identity label signals. The identity label signals may represent labels for a specific stroke, or they may represent labels for a group of strokes. In addition, an identity label may be assigned to a stroke, a stroke position or even a character based on characteristics determined separate and apart from the characteristics embodied in the stroke template. This permits other types of recognition systems to be employed in connection with the present invention. Character label signals as subsystem output information are provided at the output of the character processor 30 on the output signal line 20.

The stroke registration device 12 is responsive to handwritten input by means of a writing implement 38. Turning to FIGS. 2A and 2B, there are shown two alternatives for the stroke registration device 12. In FIG. 2A, the stroke registration device 12 comprises a conventional writing implement 38 and x-y data entry tablet 40. The tablet 40 in combination with conventional data formatting means 42, which may be built into the tablet 40, provides as an output a digital representation of each stroke of a character written on the fact of the tablet by the writing implement 38, such as a pen or a stylus. The digital representation of each stroke consists of a sequence of x and y coordinate pairs sampled in time. A typical set of coordinate pairs is one hundred coordinate pairs per second.

Alternatively, the stroke registration means 12 may be an instrumented stylus 43, friction writing surface 45 and data collection means 44, as generally disclosed in connection with U.S. Pat. No. 4,040,010 to Crane et al. The instrumented stylus 43 acting as a pattern-forming means may be provided with strain gauge transducers to sense pressure in a horizontal (x), vertical (y) and normal (z) directions, the pressures being sampled in time as pressure is applied to the writing surface 45 acting as a pattern-accommodating means to generate a sequence of x and y force signal pairs sampled in time in substantially the same form as that produced by an x-y tablet. Other forms of data input may be provided to the data processing means 16 so long as the relative position of points along a stroke are registered thereby to specify the curvature characteristics.

Turning to FIG. 3, there is shown a representative processing means 16 operative in accordance with one embodiment of the invention. First signals 14 are coupled to a preprocessor 46 of the stroke processor 26. The preprocessor 46 may drop end points and then perform an interpolation and conversion to obtain a standardized polar representation of each stroke. Specifically, the raw data in the form of a stream of x-y coordinate pairs generated as a function of time are transformed into a standard number of x-y coordinate pairs, typically thirty, as if spaced evenly along the length of a stroke under examination. The precise values of the x and y coordinates are interpolated from the raw data as if strokes were drawn at a constant rate. Selected ones of the interpolated x-y coordinate pairs may be stored for later use in the event that relative stroke position within a character is subsequently needed. The interpolated x-y coordinate pairs are converted to a plurality of standard length vectors with specific angle values calculated with high accuracy at equally spaced distance increments along the contour of the stroke under examination. Each angle value is calculated according to the following equation:

$$\theta_{i+1} = \arctan\left(\frac{y_{i+1} - y_i}{x_{i+1} - x_i}\right) \tag{1}$$

where each angle value is one of an ordered set of angle values describing the contour of the stroke. The angle value is typically resolved to about 1.5° and preferably to about 0.15°. The spacing between sample points is standardized typically on the order of 1/30th of the length of the stroke, so that data about the length of each vector need not be stored.

Implicit in the operation of the preprocessor 46 are size and speed normalization. Any two strokes which have the same basic form and which differ only in overall size or in the time required to register the stroke have essentially the same polar representation.

The output of the preprocessor 46 is provided via data line 48 to an array memory 50. The data line 48 is a bus which carries the angular position value signals. A write address line 52 may be coupled from the preprocessor 46 to the array memory 50 to provide the stroke position address of the corresponding stroke position data. The array memory 50 generally has capacity to store all of the curvature information for an entire character. Each character is normally stored in stroke sequence. Thus, the array memory 50 may be a simple shift register which is operative on a first-in first-out basis, thus eliminating the need for an explicit write address line.

It is normally necessary to segment the character information into strokes and the total information into characters. Stroke segmentation may be implemented with start/stop signals indicating the beginning and end of a stroke registration sequence. Character segmentation may be implemented by either start/stop signals or by elemental spatial sensing, i.e., by registering a single character per spatial registration field, as in a matrix of boxes on an x-y tablet. A limited amount of absolute position information may be extracted from the raw data and may be used for the purpose of character segmentation. Notwithstanding, absolute position information need not be used for initial stroke recognition processing.

The data output of the array memory 50, in the form of the relative angular values is provided to a distance metric calculator 54 via data line 56. The distance metric calculator 54 generates read address information through a read address line 58 to the array memory 50. A metric is a function which specifies the separation between any two contours based on angular position. The purpose of the distance metric calculator 54 is to compute the closeness of the curvature characteristics of a stroke under examination to each one of a set of preselected stroke templates. The stroke templates according to the invention are stored in stroke template memory 28 in the form of a two column array of precise angular position values in polar coordinates $T_i$, representing vectors of constant length tangential to the stroke, and corresponding permissible deviation values. The deviation values are represented by the Greek symbol $\sigma_i$ represent permissible deviation in the angular position values $T_i$.

According to the invention, a set of template strokes is empirically defined, and each template stroke is described by a stroke template which is specified in terms of an angular position value and a permissible angular deviation value at each data point along the template stroke. The template data points or second data points are selected to correspond with the first data points, or data points of the stroke under examination in both number and position. FIG. 5 gives pictorially a representative set of the template strokes empirically derived from the Kanji. A stroke code, that is, an identity label, has been arbitrarily assigned to each one of the stroke templates. The stroke code may be an ASCII character or the like which is suitable for data storage. The distance metric for each template is calculated in one of two ways. In the first alternative, the difference in angular displacement between the stroke under examination and the template is calculated by subtracting the angular value of each first data point from the angular value of the corresponding second data point to obtain an absolute value and then dividing the resultant difference value by the corresponding permissible angular deviation value for that data point to obtain a quotient value at each data point. All quotient values thereby obtained are summed to obtain a single distance metric value for each template relative to the stroke under examination. This distance metric is represented by the expression:

$$D_i = \sum_{j=1}^{N} \frac{|\theta_j - T_j^i|}{\sigma_j^i} \quad (2)$$

where
$D_j$ is the distance metric for the $i^{th}$ template,
$\theta_i$ is the angular position value of each first data point,
$T_j$ is the angular position value of the second data point for the $i^{th}$ template and
$\sigma_j$ is the permissible angular deviation value for the corresponding second data point of the $i^{th}$ template.

As an alternative, the quotient values are each squared prior to summation. This distance metric may then be represented by the expression:

$$D_i = \sum_{j=1}^{N} \left| \frac{\theta_j - T_j^i}{\sigma_j^i} \right|^2 \quad (3)$$

The distance metric calculator 54 draws its angular position and permissible deviation values for each second data point of each template from the stroke template memory 28 through second signal lines 18. A single metric value for each template is provided through a metric data line 60 to a metric memory table 62. The metric data is sorted in the metric memory table 62 in order from least to greatest. A write address line 64 conveys the initial address signals from the distance metric calculator 54 to the table 62. A sorter 66 coupled to the table 62 may be employed to rearrange the order of the data.

The sorted metric data output of the table 62 is coupled via a data line 68 to a recognition criteria calculator 70 and to a metric selector 72. Recognition criteria are applied according to the invention to verify whether the least distance metric so obtained actually corresponds to a predefined stroke or predefined category of strokes. The recognition calculator 70 compares the least distance metric $D_i$ and at least the next least distance metric $D_{i+1}$ with three threshold criteria, an upper decision threshold $D_U$, a lower decision threshold $D_L$, and a difference decision threshold $D_D$. The upper decision threshold $D_U$ and the lower decision threshold $D_L$, as well as the difference decision threshold $D_D$ are assigned values based on preselected tolerance levels. The lower decision threshold $D_L$ is the size of the smallest acceptable distance metric for the template of interest. The upper decision threshold $D_U$ is the smallest permissible distance metric for the second least distance metric of the set. The difference decision threshold $D_D$ is the sum of the least distance metric and a predetermined separation $D_d$. These three decision criteria are compared with the preselected least and next least distance metrics in first comparator 74, second comparator 76, third comparator 77 and fourth comparator 78. First comparator 74 yields a positive indication if the least metric $D_i$ is less than the lower decision threshold $D_L$. The second comparator 76 yields a positive logic indication if the next least distance metric $D_{i+1}$ is greater than the upper decision threshold $D_U$. The outputs of the first and second comparators 74, 76 are provided to an AND gate 80 so that the joint positive logic conditions indicate stroke recognition. The third comparator 77 yields a positive logic signal if the value of the least distance metric $D_i$ is less than the upper decision threshold $D_U$. The fourth comparator 78 yields a positive logic value if the value of the second least distance metric $D_{i+1}$ is greater than the difference decision threshold $D_D$, where $D_D = D_i + D_d$. The output of third comparator 77 is provided together with the output of the fourth comparator 78 to an AND gate 81 so that the joint positive logic conditions indicate stroke recognition. The outputs of AND gates 80 and 81 are coupled to an OR gate 82. If either of the criteria is satisfied, then the system 26 indicates it has recognized the stroke under examination. A stroke label memory 84 is enabled by the output of OR gate 82, and the stroke label of the template corresponding to the least metric $D_i$ meeting the criteria is loaded into a character memory 86 at the current stroke address, as indicated by write stroke address line 88.

In the event the recognition criteria are not met and the least metric is not accepted, the stroke label memory 84 is not enabled during the first pass of metric calculation. Instead, a stroke modifier 90 is enabled which controls a data rotator 92 and a data point position shifter 94. The data rotator 92 is operative to add or subtract an incremental value to the angular position value stored in the array memory 50 before it is supplied to the distance metric calculator 54. The stroke processor 26 then performs the same functions as before until the OR gate 82 yields either a positive or negative recognition indication. A negative recognition indication causes the stroke modifier 90 to enable the position shifter 94. The position shifter 94 operates to add or subtract a value in the address of the stroke data points, thereby effectively shifting the first data points along the length of the stroke relative to the second data points. The stroke processor 26 then processes the modified data until the OR gate 82 yields a recognition indication. In the event of a negative indication, the stroke modifier instructs the stroke label memory 84 to place a question mark in the character memory 86 at the position of the stroke under examination, thereby to indicate that the stroke was not one of the recognized set of strokes. The rotation or shifting may be implemented in any order.

The lack of stroke recognition may not be detrimental to character recognition. An unknown stroke at the designated position in the character memory may optionally be treated as a free or blank stroke. A position for the stroke may be reserved without assigning an identity label.

The character processor 30 includes the character memory 86 and a character comparator 96 to which the character dictionary memory 32 is coupled. Character data via a character data line 98 is communicated from the character memory 86 to the character comparator 96 in response to presentation of a read stroke address to the character memory 86. The character comparator 96 iterates through the character dictionary memory 32 by presenting a character address to the character dictionary memory 32 through a character address line 100. Labels of corresponding strokes of the addressed character and the character under examination are presented to the character comparator 96 through a character dictionary line 102 in response to the character address and stroke address. The character comparator 96 is operative to compare the stroke labels from the character memory 86 with the stroke labels from the dictionary memory 32 to provide as its output a third signal in the form of a character label whenever a character is recognized.

In Kanji recognition system, the character dictionary may be arranged efficiently in groups of characters by the number of strokes per character, each character being described by character labels set out in stroke sequence. The stroke count is derived from the character memory 86. The character dictionary may be developed from empirical experience based on the examination of the practices of various native writers. A single character may be represented by a number of alternative character sequences, thereby taking into account sequence and stroke differences while retaining the advantage of information inherent in sequence.

A particularly powerful tool of this invention is the distance metric calculator 54 and stroke template set wherein the stroke template set comprises both position information and permissible deviation information. This form of template allows selective disregard for certain input information about a stroke and eliminates the need for additional templates to take into account stroke variations which do not satisfy the precise position criteria and yet which most nearly satisfy the general template criteria. Another powerful tool of the invention is the use of an angular or polar representation at equidistant points along a stroke to characterize the curvature of the stroke. This tool simplifies character processing at the earliest stages by eliminating unnecessary variables such as vector length.

Referring now to FIG. 7, there is shown a flow chart for one computer implementation of a specific system according to the invention. Initially, position data as a function of time are manually input, generally in the form of pairs of points x and y at sample times t (Step A). The string of position functions are thereafter converted to a string of vectors of precise polar values at preselected sample points along a standard stroke (Step B). The string of values is then separated into sets, each set representing a stroke. A stroke counter may be set to keep track of the number of strokes in a character (Step C). Stroke templates have been preset in the form of a string of vector values $T_i$ and deviation values $\sigma_i$ (Step D). All stroke templates are then read (Step E), and the distance metrics for all templates with respect to a particular stroke under examination are calculated (Step F). Thereafter, the distance metrics are sorted in order from least to greatest (Step G). The least distance metric corresponds to the most likely candidate label for the stroke under examination. However, recognition criteria are applied according to the invention to enhance the likelihood of accurate recognition. First, the least distance metric is compared with the lower decision threshold (Step H). If the indication is that the least distance metric $D_i$ is less than the lower decision threshold, $D_D$ the next least distance metric $D_{i+1}$ is compared with the upper decision threshold $D_U$ to see if the next least distance metric $D_{i+1}$ exceeds the upper decision threshold $D_U$ (Step J). If the indication is positive, then the system writes the stroke label corresponding to the least distance metric to the character memory indicating acceptance and thus recognition of the stroke (Step K). If the indication of either of the previous threshold level tests is negative, an alternative decision process is applied. First, the least distance metric $D_i$ is compared with the upper decision threshold $D_U$ to see if the metric $D_i$ is less (Step L). If yes, then the next least distance metric $D_{i+1}$ is compared with the difference decision threshold $D_D$ to see if the threshold $D_D$ is exceeded. The difference decision threshold $D_D$ is the sum of the least distance metric $D_i$ and the preselected separation $D_d$ (Step M). If the indication is positive, then the system indicates that it has recognized the stroke (Step K).

If the decision indication is negative in either of the previous cases, then the system implements shift and/or rotate processing to realign the data or to rotate the values of the data (Steps N,O and P,Q). The steps are repeated from the read in of the templates (Step E) until a decision is made. If none of the decision threshold criteria are met, the system ultimately writes the identity label as a question mark (Step R), and then the system goes to the next stroke. If the stroke is not the last stroke (Step S), then the stroke count is incremented (Step T) and the process is repeated for the next stroke. If the stroke is the last stroke, then the system conducts the character dictionary search (Step U) to identify the character. (In some embodiments, the dictionary search may be instituted before stroke labeling is completed.)

Referring to FIG. 6, an alternative handwritten character recognition system 110 is shown which is similar to the system 10 of FIG. 1. Identical elements are designated by the same numerals.

According to another aspect of the invention, the data processing means 16 includes means for comparing the first signal information with second signal information independent of stroke position and further independent of stroke size to obtain an identification of the stroke under examination. Only the curvature characteristics of the stroke under examination are specified, and generally to a relatively high degree of accuracy, for use in identifying and labeling the stroke. A limited amount of position information about each stroke may be stored in a stroke position memory 102 for possible later use after the identity label has been assigned to the stroke under examination.

The processing means 16 includes a stroke processor 26, a stroke template memory 28, a character processor 30 and a character dictionary memory 32. The stroke template memory 28 is responsive to a signal on a template address select line 34 to provide second signals on a second signal line 18 specifying a template address to the stroke processor 26. The stroke processor 26 identifies the stroke represented by the first signal information based on the second signal information. The first signal information applied to the stroke process 36 may be stripped of information regarding stroke position relative to related strokes, since relative stroke position plays no part of the initial stroke recognition process. An identity label signal is provided at the output of the stroke processor 26 by a stroke label line 36 to the character processor 30. The character dictionary memory 32 is responsive to a signal on a character address select line 33 to provide signals on a character label line 31 to the character processor 30. The character processor 30 identifies characters as represented by a collection of identity label signals. When a single character has been identified and accepted, a character label signal is provided at the output of the character processor 30 on the third signal line 20. A graphic translator 22 converts the character label signals to a display signal and the output device 24 displays or presents the character. In the event more than one character is found to match the set of identity label signals employed to search the character dictionary, all are displayed and a stroke registration device 12 may then be used by an operator to indicate which of the displayed characters is to be accepted as the intended character. Upon receipt of such an identification or upon default, the intended character is then registered or otherwise used in a data processing sequence.

Where the character processor 30 identifies that more than one character corresponds to a single identity label sequence, automatic means may also be provided for distinguishing among characters. For example, a stroke position resolver 104 may be provided which generally operates under control of the character processor 30 to receive selected information regarding positions of strokes relative to one another from stroke position memory 102 through data line 106 upon a signal through address line 108. The stroke position resolver is operative to receive selected relative stroke position information about tentatively identified characters from a stroke position template memory 110 through data line 112 upon receipt of a signal through address line 114. The template memory 110 contains a limited amount of information about relative positions of selected strokes of characters which are likely to be confused, such as relative position of key points in a reference plane. Data and control lines 116, 118 from the character processor 30 activate the stroke position resolver 104 to produce a character identity label through output line 120. Information regarding stroke position may be extracted from the stroke processor 26 prior to stroke processing and provided to the stroke position memory 102 through an input line 103. The stroke registration device 12 is responsive to handwritten input by means of a writing implement 38.

Referring now to FIG. 7, there is shown a flow chart for another computer implementation of the stroke recognition portion of the system according to the invention. Initially, position data as a function of time are manually input, generally in the form of pairs of points x and y at sample times t (Step A). There follows the storage of selected positional information for possible later use (Step A-1) and the conversion of the string of position functions to a string of angular values at preselected sample points along a standard stroke, without reference to position (Step B). The string of values is then separated into sets, each set representing a stroke. A stroke count may be set to keep track of the number of strokes in a character (Step C). Stroke templates have been provided in the form of a string of polar coordinate angular values $T_i$ and deviation values $\sigma_i$ (Step D). All stroke templates are then read (Step E), and the distance metrics for all templates with respect to a particular stroke under examination are calculated (Step F). Thereafter, the distance metrics are sorted in order from least to greatest (Step G). The least distance metric corresponds to the most likely candidate for the recognized stroke. However, recognition criteria are applied according to the invention to enhance the likelihood of accurate recognition. First, the least distance metric is compared with the lower decision threshold (Step H). If the indication is that the least distance metric $D_i$ is less than the lower decision threshold, $D_D$, then the next least distance metric $D_{i+1}$ is compared with the upper decision threshold $D_U$ to see if the next least distance metric $D_{i+1}$ exceeds the upper decision threshold $D_U$ (Step J). If the indication is positive, then the system writes the identity label to the character memory indicating recognition of the stroke (Step K). If the indication of either of the previous threshold level tests is negative, an alternative decision process is applied. First, the least distance metric $D_i$ is compared with the upper decision threshold $D_U$ to see if $D_i$ is less than $D_U$ (Step L). If yes, then the next least distance metric $D_{i+1}$ is compared with the difference decision threshold $D_D$ to see if the threshold $D_D$ is exceeded. The difference decision threshold $D_D$ is the sum of the least distance metric $D_i$ and the preselected separation $D_d$ (Step M). If the indication is positive, then the system indicates that it has recognized the stroke (Step K).

If the decision indication is negative in either of the previous cases, then the system activates the shift and/or rotate processors to realign the data or to rotate the values of the data (Steps N,O and P,Q). The steps are repeated from the read in of the templates (Step E) until a decision is made. If the decision threshold criteria are not met, the system writes the stroke label as a question mark (Step R), and then the system goes to the next stroke. If the stroke is not the last stroke (Step S), then the stroke count is incremented (Step T) and the process is repeated for the next stroke. If the stroke is the last stroke, then the system conducts the character dictionary search (Step U) to identify the character. The character dictionary search is conducted as described above.

The invention has now been explained with reference to specific embodiments. Other embodiments will be apparent to those of ordinary skill in the art. It is therefore not intended that this invention be limited except as indicated by the appended claims.

We claim:

1. A method for identifying patterns by means of a pattern registration means and a data processing means, wherein each pattern comprises at least one stroke based upon relative movement between a pattern-forming means and a pattern-accommodating means of said registration means, said registration means being operative to generate first signal information represented by first signals specifying relative position sequentially along a stroke, said data processing means being provided with prestored second signal information represented by second signals and being operative to generate third signals representing third signal information, said third signal information comprising specification of identity labels for strokes for use in developing coded information specifying said pattern, said method comprising for at least one stroke:
   designating from said first signal information a set of sequential first data points, said set of first data points being selected from or interpolated on the basis of said first signal information along said stroke;
   defining templates consisting of said second signal information, each said template comprising a set of second data points defining relative sequentially related position values and a set of permissible tolerance values, each of said tolerance values representing a preselected deviation for its associated second data point, at least one of said permissible tolerance values differing from at least one other of said permissible tolerance values for a single template; and
   comparing said first data points with said second data points to determine which of said templates provides best correspondence between said first and second signal information to produce said third signal information.

2. The method according to claim 1, wherein position is represented in terms comprising angular numerical values in a polar coordinate system.

3. The method according to claim 1, wherein position is represented in terms comprising locations in a Cartesian coordinate system.

4. The method according to claim 1 or 2, further including the step, in the absence of acceptance of an identity label, of modifying said first signal information by adding or subtracting an incremental numerical value of at least one of said first data points and again comparing said first data points with each said template.

5. The method according to claim 4, wherein said modifying step comprises rotating said first signal information of at least one of said first data points relative to said second data points.

6. The method according to claim 1 or 2, further including the step of spacing said first and second data points evenly along a stroke, at least some of said first data points being points interpolated from said first signal information.

7. The method according to claim 1 or 2, characterized in that first data points are represented in terms comprising angular position values in a polar coordinate system at locations interpolated to correspond to locations of said second data points of said template.

8. The method according to claim 1 or 2, wherein said stroke registration means is a signal-receiving means responsive to movement of said character-forming means, and including the step of registering a stroke upon said stroke registration means.

9. The method according to claim 8, wherein said character-forming means comprises a writing implement and said stroke-registration means comprises a pressure-sensitive position-registering tablet, including the step of writing with said writing implement upon said tablet.

10. The method according to claim 1 or 2, wherein said character-forming means and said stroke-registration means comprise an instrumented writing implement operative to generate transducer signals specifying pressure and direction versus time, including the step of supplying said signals representing said first signal information to said data processing means in response to writing on a friction surface.

11. The method according to claim 1 or 2, further including the step, in the absence of acceptance of an identity label, modifying said first signal information to effect a displacement of said first data points relative to said second data points and again compares said first data points with each said template.

12. In the method according to claim 11, wherein said modifying step further comprises shifting said first data points relative to said second data points along stroke length.

13. In the method according to claim 1 or 2, further including the step of resolving said first signal information with an angular resolution at each one of said first data points to within no greater than 1.5 degrees.

14. In the method according to claim 1 or 2, further including the step of resolving said first signal information with an angular resolution at each one of said first data points to within no greater than 0.15 degrees.

15. In the method according to claim 1 or 2, wherein said comparing step comprises computing the closeness between each one of said first data points and said second data points to obtain a distance metric value.

16. The method according to claim 15, further including the step of comparing said distance metric value for each said template with an upper decision threshold value, with a lower decision threshold value and with a difference decision threshold value in order to obtain said identity label.

17. The method according to claim 16, further including the step of assigning a specific identity label of one of said predefined template strokes if the least distance metric value is less than the lower decision threshold value and if the next least distance metric value is greater than the upper decision threshold value.

18. In the method according to claim 1 or 2, further including the step of calculating distance between corresponding first data points and second data points to obtain difference values; dividing each one of said difference values by the corresponding permissible angular deviation value to obtain quotient values; and summing all quotient values to obtain a distance-metric value.

19. In the method according to claim 18, further including the step of squaring each one of said quotient values prior to summing.

20. In the method according to claim 1 or 2, further including the steps of:
combining said third signals representing said identity label with other third signals representing other identity labels so obtained to form fourth signals representing a group of related identity labels; and
comparing said fourth signals against fifth signals, said fifth signals representing an index to character labels specified by sets of related identity labels to produce sixth signals, said sixth signals representing a character label corresponding to said group.

21. The method according to claim 20, further including the step of employing said sixth signals to form a visual pattern representing the character identified by said character label.

22. The method according to claim 20, wherein said character label corresponds to a Kanji character.

23. The method according to claim 22 wherein said Kanji character is handwritten relative to preceding first data points.

24. The method according to claim 20, further including the step of using information regarding sequence of said identity labels to produce said sixth signals representing character labels.

25. The method according to claim 1 or 2, further including the step of comparing said second signal information with said first signal information independent of absolute stroke position values.

26. The method according to claim 25, further including the step of preserving selected absolute stroke position values of said first signal information independent of said identifying step, and employing said selected absolute stroke position values to resolve ambiguity among recognized patterns only in the event a plurality of patterns is indicated for a single accumulation of identity labels.

27. In an apparatus for identifying patterns by means of a pattern registration means and a data processing means, wherein each pattern comprises at least one stroke based on relative movement between a pattern-forming means and a pattern-accommodating means of said stroke registration means, said stroke registration means being operative to generate first signal information represented by first signals specifying relative position sequentially along a stroke, said data processing means being provided with prestored second signals and being operative to generate third signals representing third signal information, said third signal information comprising specification of identity labels for strokes for use in developing coded information specifying said pattern, the improvement characterized in that:
said data processing means includes means for designating from said first signal information a set of sequential first data points, said set of first data points being selected from or interpolated on the basis of said first signal information, along said stroke means defining templates consisting of said second signal information, each said template comprising a set of second data points defining relative sequential position values and set of permissible tolerance values, each of said tolerance values representing a preselected deviation for its associated second data point, at least one of said permissible tolerance values differing from at least one other of said permissible tolerance values for a single template; and
means for comparing said first data points with said second data points to determine which of said templates provides best correspondence between said first and second signal information to produce said third signal information.

28. In the apparatus according to claim 27, characterized in that said pattern-accommodating means is a signal-receiving means responsive to relative movement of said pattern-forming means.

29. In the apparatus according to claim 27 wherein said pattern-forming means comprises a writing implement and said pattern-accommodating means comprises a pressure-sensitive position-registration tablet.

30. In the apparatus according to claim 27 wherein said pattern-forming means and said pattern-accommodating means are characterized by an instrumented writing implement operative to generate transducer signals specifying pressure and direction versus time in response to an act of writing with said implement on a friction surface.

31. In the apparatus according to claim 27, characterized in that said data processing means includes means for rotating said first signal information relative to position values of said second signal information.

32. In the apparatus according to claim 27, characterized in that said data processing means includes means for displacing said first signal information relative to position values of said second signal information.

33. In the apparatus according to claim 27, characterized in that said data processing means includes means for preserving selected absolute stroke position values of said first original information independent of said identifying step and to employ said selected absolute stroke position values to resolve ambiguity among recognized patterns only in the event a plurality of patterns is indicated for a single accumulation of identity labels.

34. In the apparatus according to claim 27, characterized in that said data processing means includes means for comparing said first signal information with said second signal information independent of relative stroke size.

35. In the apparatus according to claim 27, characterized in that said data processing means includes means for comparing said second signal information with said first single information independent of absolute stroke position values.

36. The apparatus according to claim 27 wherein said comprising means includes means coupled to receive said first signal information and said second signal information for computing closeness between each one of said first data points and said second data points to obtain a distance metric value for each one of said templates, means coupled to receive each said distance metric value for comprising each said distance metric value with an upper decision threshold, with a lower decision threshold and a difference decision threshold, and means for assigning a specific identity label of one of said predefined template strokes as said third signal information if the least distance metric value is less than the upper decision thresold value and if the next least distance metric value is greater than the sum of the least distance metric value and the difference decision threshold value.

37. A method for identifying patterns by means of a pattern registration means and a data processing means, wherein each pattern comprises at least one stroke based upon relative movement between a pattern-forming means and a pattern-accommodating means of said registration means, said registration means being operative to generate first signal information represented by first signals specifying relative position sequentially along a stroke, said data processing means being provided with prestored second signal information represented by second signals and being operative to generate third signals representing third signal information, said third signal information comprising specification of identity labels for strokes for use in developing coded information specifying said pattern, said method comprising for at least one stroke:

designating from said first signal information a set of first data points on the basis of said first signal information along said stroke;

defining templates consisting of said second signal information, each said template comprising a set of second data points defining at least relative sequentially related position values;

comparing said first data points with said second data points by computing the closeness between each one of said first data points and said second data points to obtain a distance metric value for each of said templates, thereafter comparing said distance metric value for each said template with an upper decision threshold, with a lower decision threshold and with a difference threshold and assigning a specific identity label of one of said predefined template strokes as said third signal information if the least distance metric value is less than the upper decision threshold value and if the next least distance metric value is greater than the sum of the least distance metric value and the difference decision threshold value.

38. The method according to claim 37, further including the step, in the absence of acceptance of an identity label, of modifying said first signal information by adding or subtracting an incremental numerical value of at least one of said first data points and again comparing said first data points with each said template.

39. The method according to claim 37, further including the step, in the absence of acceptance of an identity label, modifying said first signal information to effect a displacement of said first data points relative to said second data points and again compares said first data points with each said template.

40. In the method according to claim 37, further including the steps of:

combining said third signals representing said identity label with other third signals representing other identity labels so obtained to form fourth signals representing a group of related identity labels; and comparing said fourth signals against fifth signals, said fifth signals representing an index to character labels specified by sets of related identity labels to produce sixth signals, said sixth signals representing a character label corresponding to said group.

41. The method according to claim 37, further including the step of comparing said second signal information with said first signal information independent of absolute stroke position values.

42. The method according to claim 37, further including the step of preserving selected absolute stroke position values of said first signal information independent of said identifying step, and employing said selected absolute stroke position values to resolve ambiguity among recognized patterns only in the event a plurality patterns is indicated for a single accumulation of identity labels.

* * * * *